July 20, 1954
M. F. KRITCHEVER
2,683,894
APPARATUS FOR TREATING PLASTIC FILM
Filed June 27, 1951
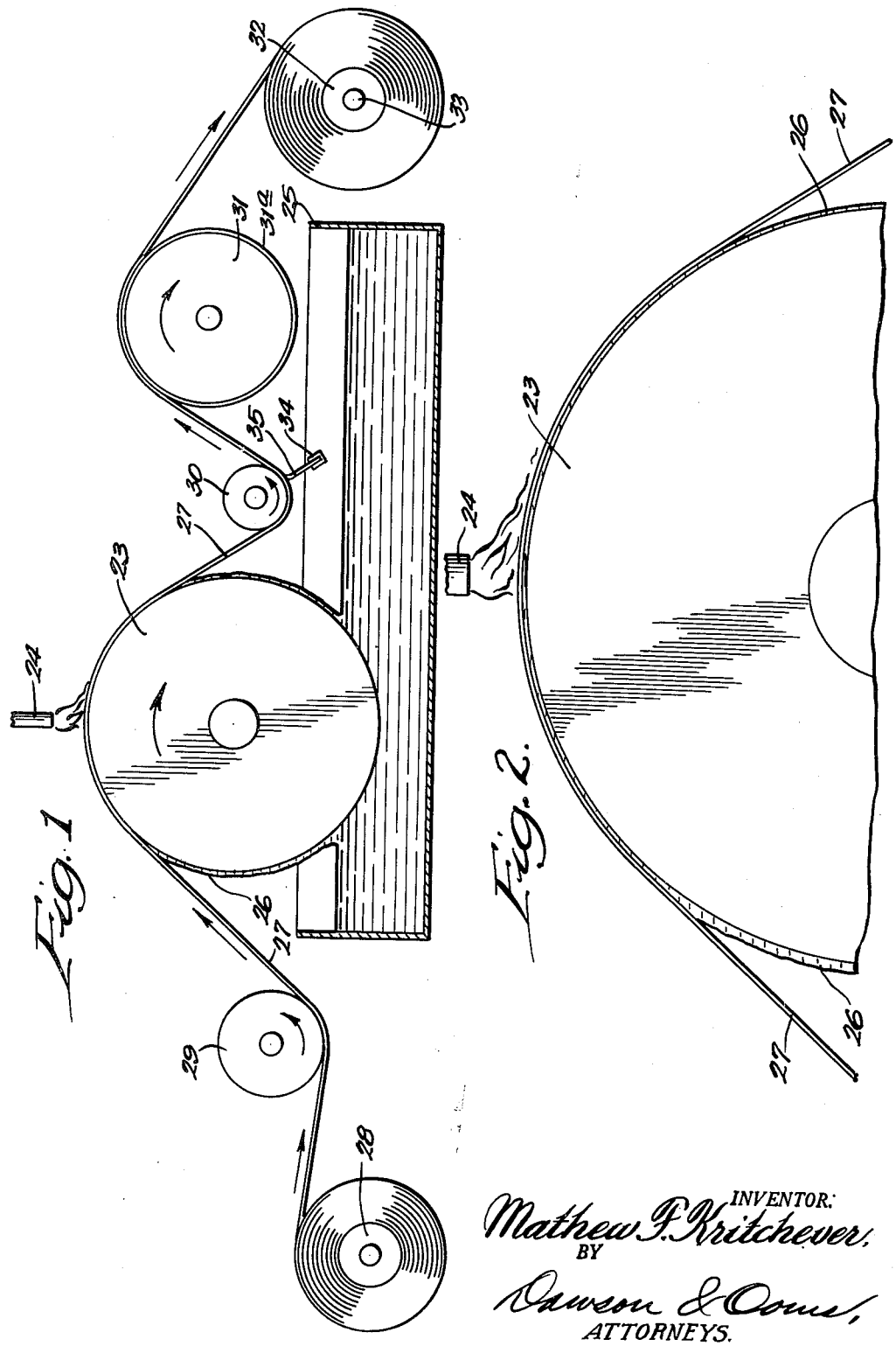
INVENTOR:
Mathew F. Kritchever,
BY
Dawson & Ooms,
ATTORNEYS.

Patented July 20, 1954

2,683,894

UNITED STATES PATENT OFFICE 2,683,894

APPARATUS FOR TREATING PLASTIC FILM

Mathew F. Kritchever, Wilmette, Ill., assignor to Traver Corporation, Chicago, Ill., a corporation of Illinois Application June 27, 1951, Serial No. 233,829

3 Claims. (Cl. 18—1)

This invention relates to apparatus for treating plastics, and more particularly to means for treating resinous films or plastic materials which have heretofore been considered unreceptive to coating compositions, etc. so as to render them receptive for such printing, coating, etc. The means is also effective in changing the character of the surface of the films or plastic articles, etc., enabling them to be united, bonded, imprinted, and treated in many other ways.

The present invention constitutes a continuation-in-part of my copending application Serial No. 150,414 for Treating Polyethylene Plastics for Printing, now abandoned.

In most respects, anchorage of the printing or coating compositions on various types of surfaces depends upon some type of physical or chemical bond existing between the coating or printing compositions and the surfaces upon which they are to be applied. When printing on paper or other porous surfaces, anchorage of the printing ink or coating composition is achieved by partial impregnation and infiltration of the composition into the pores of the fibrous structure which enables the development of a firm gripping relation with the surface in a type of physical interlocking. When printing or coating onto smoother surfaces, such as plastic, glass or the like, reliance is usually had upon a physico-chemical bond, such as softening of the material on the plastic surfaces to be printed, as by means of a mutual solvent, to make possible a type of integration of one material with the other.

With a material such as polyethylene, the possibilities for anchorage in the usual manner are substantially absent. This is especially true with polyethylene plastics, the molecules of which have been orientated by stretching while in plastic condition and then setting as in the manufacture of film or sheet stock. The difficulties with printing on polyethylene surfaces apparently arise from the smoothness of the surfaces, which militates against purely physical anchorage, and the inertness of the resinous polymers which militates against development of a bond through the technique of eating into the surfaces to be printed by solvents or the like, usually embodied in the printing or coating composition.

In view of the increasing use of polyethylene in the form of film, sheet stock, or containers for packaging, it becomes important to provide a system which permits printing thereon, on a mass production basis, characteristic of modern packaging technique. It is an object of this invention to overcome the difficulties of printing or coating onto polyethylene, and it is a related object to overcome the same type of difficulties which are also inherent in plastic film, sheet stock and molded products based upon the resin polyvinylidene chloride and copolymers thereof with vinylchloride and vinylacetate.

In accordance with this invention, a surface highly receptive to the common ink and coating compositions is developed on polyethylene or polyvinylidene chloride by directing a gas flame onto the surfaces to be printed for a relatively short time without raising the mass of the plastic to a temperature enabling distortion. If the plastic material is in the form of a film of thin sheet stock, it is expedient to direct the flame onto the surfaces of the plastic while the opposite wall is being cooled. If the flame directed onto the plastic surfaces is in excess of 1300° F., preferably within the range of 1300° to 1600° F., almost instantaneous conversion to a highly ink receptive surface is secured. Even better results are obtained when the flame temperature is higher, say up to 3600° F., or higher, and the period of exposure of the plastic surface to the flame is considerably shortened. If lower temperatures are employed, it may be necessary to prolong the flame treatment or to provide successive treatments, keeping in mind that the plastic should not be heated through to a temperature permitting plastic flow. In any event it is seldom that more than a second or a fraction of a second is required.

At present, beneficial results have been only achieved by direct contact of a flame with the plastic surface.

In the cooling of the plastic body it has been found that adverse results are sometimes experienced when a pocket of air is trapped between the polyethylene and the cooling roller. Since the air forms an insulating space on the opposite side of the film, that portion of the film remains uncooled during the flame-treating step. Further, the thin wide film of polyethylene is handled with difficulty because of its width and thinness and often irregularities occur which prevent the effective cooling.

I have found that the above difficulties can be overcome by providing a liquid cooling bath in conjunction with the roller so as to apply a film of water or other liquid below the film as it is being flame-treated. The liquid film prevents the formation of air pockets, etc. and in fact provides a surface on which the film seems to float. Further, such a liquid film is found to be unusually effective in cooling the side of the film opposite that exposed to the flame. In conjunction with the above apparatus I provide means for removing the moisture clinging to the under side of the film so that the film may then be rolled or otherwise stacked.

An object of the invention is to provide apparatus and means for treating a polyethylene, polyvinylidene chloride, or other film surface to render the same receptive to ink and other coatings, etc. while providing means for continuously rolling or stacking the treated materials. A further object is to provide effective apparatus for directing a gas flame onto the plastic surface while providing improved means for cooling the opposite surface of the plastic during its exposure to the intense heat of the flame. Yet another object is to provide a method and means for cooling polyethylene, polyvinylidene chloride or other plastic films or articles while the same are being exposed to contact with a flame. Yet another object is to provide a means and method for applying liquid to an under surface of such plastic films while impinging a flame on the opposite side. A still further object is to provide a method and means for floating such a plastic film upon a liquid cooling film while flame-treating the opposite side of the film and while providing also means for removing moisture from the cooled side of the film. Other specific objects and advantages will appear as the specification proceeds.

The invention is illustrated by the accompanying drawings, in which—

In the illustration given in Figs. 1 and 2, I employ a liquid bath for feeding a film of water or other cooling liquid onto the driven roll 23. I find that the water forms a film over the roll 23 and prevents the formation of air pockets underneath the film. Further, the liquid gives a highly effective means for cooling the under side of the film as it is being subjected to the flame leaving the pipes 24 thereabove. The water or other cooling liquid is supported within an open vessel 25 and the rotation of drum or roll 23 causes a film 26 of water or other cooling liquid to form thereon, as illustrated in Figs. 4 and 5.

In the specific illustration given, the polyethylene film 27 or other film to be treated leaves the roll 28, passing under the roll 29. As the film 27 approaches the roll 23, it meets the ascending water film 26 and the thin wide sheet of film appears to float upon this liquid film as it follows the upper contour of the roll 23. The film then passes under the guide roll 30 over a vacuum roll 31 and finally is wound upon the core 32 carried by mandrel 33. By rotating drum 23 at a peripheral speed slightly greater than the surface speed of film 27, water is packed into the tangential junction space creating a relatively high pressure area which excludes air.

A U-shaped support 34 is carried by the vessel 25 and within the support is mounted a doctor blade 35 adapted to engage the bottom portion of the film 27 to remove liquid droplets therefrom and to cause them to return to the tank or vessel 25. A vacuum drier roll 31, which is of well-known construction, may be provided for removing any remaining traces of moisture on the film prior to the rolling of the film onto the core 32. In the specific illustration given, the roll 31 is provided with an outer felt or absorbent cloth layer 31ᵃ and a slight vacuum is maintained on the inside of the drum for drawing the moisture inwardly. Since this device is of well-known construction, a further detailed description is believed unnecessary. Instead of employing vacuum in the drum 31, the felt pad 31ᵃ can be kept in absorbent condition by the use of heating means, electronic means, etc.

The method of flame-treating described above seem to be highly effective when the temperatures are maintained at elevated ranges in the neighborhood of 3600° F., while greatly reducing the moment of exposure of the film to the flame. Not only are the results better but also the processing is greatly speeded up.

I have found that certain plastic materials do not respond to the flame-treating method and apparatus described. Polyethylene is highly responsive and not only does the treated surface thereafter, even after days and months of delay, readily receive printing inks, coatings, etc. but also the treated surfaces enable sheets of polyethylene to be readily laminated. Where prior to treatment the film or laminae could not be effectively bonded, after flame treating, such films or other laminae are secured readily by the use of ordinary adhesives.

The proposed process and method as to the lamination of plastics applies best to polyethylene and polyvinylidene chloride, permitting polyvinylidene chloride to be laminated to polyethylene, polyvinylidene chloride to be laminated to itself, polyethylene to be laminated to itself, polyethylene to be laminated to cellophane, polyvinylidene chloride to be laminated to cellophane, and other combinations of both polyethylene and/or polyvinylidene chloride to be laminated to standard commercial films. To render the polyvinylidene chloride or the polyethylene susceptible to the adhesive, the film is run over the cooled rotating drum described, while exposing the same to the hot flame described. Then the second film is treated in the same way. The adhesive is then applied to one or both surfaces to be joined. The two films are then brought into contact with each other with the adhesive or treated sides together, and maximum surface contact is obtained by rolling the two together between rolls. Preferably the adhesive is one of a polymerizing type with high cohesive strength, but satisfactory bonding can be had with a variety of types of adhesive and in some instances it is found that ordinary printing inks of a high polymerizing type may be successfully used to laminate and provide color to the transparent films. Where a film of a type which is presently being successfully laminated is to be joined to a film which has not heretofore been bondable, such as polyethylene or polyvinylidene chloride, the heat-treating step need only be applied to the polyethylene or polyvinylidene chloride because the adhesive chosen will itself bond to the untreated film.

The apparatus and means herein described is also efficacious in enabling color-coding of polyethylene-coated electrical wire or cable. The polyethylene-insulated wire is rapidly passed through a jet of flame so that the flame envelops the wire. Temperatures as high as 2800° to 3200° F. have been found very useful, the movement of the wire being so rapid that the critical temperature of the polyethylene is not reached by the body of polyethylene but merely the surface is affected. It is believed that this treatment reorients the surface molecules, breaking the surface tension, and creating myriads of molecule "chains" to which the subsequently-applied ink will cling. A wide variety of commercially-available inks may be used with excellent results. The speed of treating is proportional to the number of flame jets used or to the temperature of the flame. The treatment may be made at any time prior to color application as, for example, from one second to one year, etc. While I have set out specific uses for the apparatus and means described, it will be understood there are many other uses to which it and the methods herein may be applied.

While in the foregoing specification I have set forth specific steps and elements in considerable detail, for the purpose of illustrating embodiments of the invention, it will be understood that such details may be varied widely by those skilled in the art without departing from the spirit of my invention.

I claim:

1. In apparatus for treating polyethylene film, a rotatably mounted roller adapted to convey the film, a vessel supported below said roller and adapted to contain cooling fluid in contact with the lower portion of said roller, means for advancing said film over said roller, means for rotating said roller to convey cooling fluid to the top portion thereof beneath said film, and means for impinging a flame upon the upper side of said polyethylene film directly opposite said liquid on said roller.

2. Apparatus for treating plastic film, comprising a vessel containing cooling liquid, a roller supported for rotation above said vessel and with the lower portion of the roller in the liquid carried by said vessel, means for rotating said roller to form a film on the outer surface thereof, means for conveying plastic film to be treated onto the liquid film carried by said roller, a burner supported for directing flame into contact with said plastic film on a side directly opposite said liquid film, and means for removing moisture from the lower side of said plastic film.

3. Apparatus for treating plastic film, comprising a vessel containing cooling liquid, a roller supported for rotation above said vessel and with the lower portion of the roller in the liquid carried by said vessel, whereby upon rotation of said roller, a film of liquid is formed on the outer surface thereof, means for conveying a plastic film to be treated onto the liquid film carried by said roller, and a burner supported above said film and directing flame downwardly into contact with said film on a side directly opposite said liquid film.

References Cited in the file of this patent

UNITED STATES PATENTS

| Number | Name | Date |
| --- | --- | --- |
| 2,248,714 | Lytle | July 8, 1941 |
| 2,412,429 | Slingluff et al. | Dec. 10, 1946 |
| 2,576,317 | Toulmin | Nov. 27, 1951 |

OTHER REFERENCES

Meyers "Polyethylene," Plastics, Sept. 1944, pp. 39, 40, 42, 43, 100.